United States Patent [19]

Bohman et al.

[11] Patent Number: 4,805,385
[45] Date of Patent: Feb. 21, 1989

[54] VARIABLE SENSITIVITY METAL DETECTION SYSTEM

[75] Inventors: Carl E. Bohman, New Holland; Mark K. Chow, Leola, both of Pa.

[73] Assignee: Ford New Holland, Inc., New Holland, Pa.

[21] Appl. No.: 138,990

[22] Filed: Dec. 29, 1987

[51] Int. Cl.$^4$ .............................................. A01D 75/18
[52] U.S. Cl. .............................. 56/10.2; 56/DIG. 15
[58] Field of Search ......................... 56/10.2, DIG. 15

[56] References Cited

U.S. PATENT DOCUMENTS

| | | | |
|---|---|---|---|
| 3,959,953 | 6/1976 | Garrott | 56/10.2 |
| 3,972,156 | 8/1976 | Bennett et al. | 56/10.2 |
| 4,322,937 | 4/1982 | Hollmann | 56/10.2 |
| 4,531,118 | 7/1985 | Beams | 56/10.2 |

FOREIGN PATENT DOCUMENTS 3341071 5/1984 Fed. Rep. of Germany ....... 56/10.2

*Primary Examiner*—John Weiss
*Attorney, Agent, or Firm*—Griffin, Branigan & Butler

[57] ABSTRACT

In a forage harvester having a metal detector positioned within a first feed roll and a second feed roll whose displacement from the first feed roll varies with the bulk of crop material passing between the feed rolls, the sensitivity of the metal detector is adjusted according to the displacement of the second feed roll from the metal detector to provide a more uniform detection of tramp metal with varying crop bulk. The sensitivity is increased as the inherent noise component induced in the metal detector output signal by the second feed roll decreases as the second feed roll is displaced from the metal detector by crop bulk.

9 Claims, 1 Drawing Sheet

VARIABLE SENSITIVITY METAL DETECTION SYSTEM

BACKGROUND OF THE INVENTION

The present invention relates to metal detection systems such as those used in forage harvesters.

In a forage harvester it is well known to provide upper and lower front feed rolls and upper and lower rear feed rolls for compacting a crop material and feeding it to a cutter head assembly which cuts it into smaller pieces. The bulk of the crop material passing between the upper and lower feed rolls varies. To assure compaction and feed of the crop material, Shriver U.S. Pat. No. 4,278,211 proposes mounting the upper feed rolls on an assembly which is biased under spring tension toward the lower feed rolls.

It is also well known to provide a metal detector in a forage harvester to detect tramp metal in the crop material, the detector producing an output signal to stop the feed rolls before the cutter head can be damaged by the crop material. Garrott U.S. Pat. No. 3,959,953 discloses such a metal detector located within the lower front feed roll of a forage harvester. In normal operation the metal detector inherently exhibits a certain level of output due to the rotation of metallic machine elements in its sensing field. This output is commonly referred to as noise, and its major contributors are the rotating feedrolls: lower front, lower rear and upper front and upper rear. The detection threshold of the metal detector is typically set high enough to prevent stopping the feedrolls in response to this noise. Entry of a piece of tramp metal into the sensing region of the metal detector induces a signal which, when added to the aforementioned noise increases the level of output so as to exceed the detection threshold causing the feed rolls to stop.

With the advent of tensioned upper feed rolls, the contribution of noise by the upper feed rolls has become variable over a wider range than before as the upper feedrolls can be displaced further from the metal detector as the volume of crop entering the harvester increases. Upward displacement of the upper feedrolls moves them farther from the metal detector thereby diminishing their contribution to the noise. Consequently, with the diminished noise, a large signal is needed from the tramp metal to exceed the detection threshold. Or, stated otherwise, a piece of tramp metal which resulted in marginally reaching the metal detector detection thershold while the upper feedrolls were in their lowermost position, would fall short of the detection threshold with diminished noise when the upper feedrolls are displaced by a larger volume of crop material. Thus it is seen that the ability of the metal detector to respond to smaller pieces of tramp metal is compromised as larger volumes of crop material displace the tensioned upper feed rolls upwardly, reducing their noise contribution, and thereby decreasing the liklihood of detection.

SUMMARY OF THE INVENTION

An object of the present invention is to provide a method of, and apparatus for, varying the sensitivity of a metal detector according to the displacement of moving machine parts relative to the metal detector.

An object of the present invention is to provide a method and apparatus for varying the threshold level at which a metal detector system produces an output signal to stop the feed drive in a forage harvester, the threshold level being varied in accordance with the bulk rate of crop flow through the harvester.

In accordance with the principles of the present invention, a forage harvester having upper and lower feed rolls, a metal detector in one of the feed rolls, and tensioning means for a second of the feed rolls, is provided with a sensing apparatus for sensing displacement of the second feed roll relative to the first feed roll as the bulk rate of crop flow between the feed rolls varies, the sensing apparatus producing an output signal to vary the threshold level above which an output signal from the metal detector stops movement of the feed rolls. The threshold level may be varied by varying the threshold level of a threshold detector to which the metal detector output signal is applied. Alternatively the threshold level may be varied by applying the output signal from the sensing apparatus to a variable gain amplifier which amplifies the metal detector output signal before applying it to the threshold detector.

Other objects of the invention and its mode of operation will become apparent upon consideration of the following description and the accompany drawings.

DETAILED DESCRIPTION OF THE INVENTION

Figure 1:
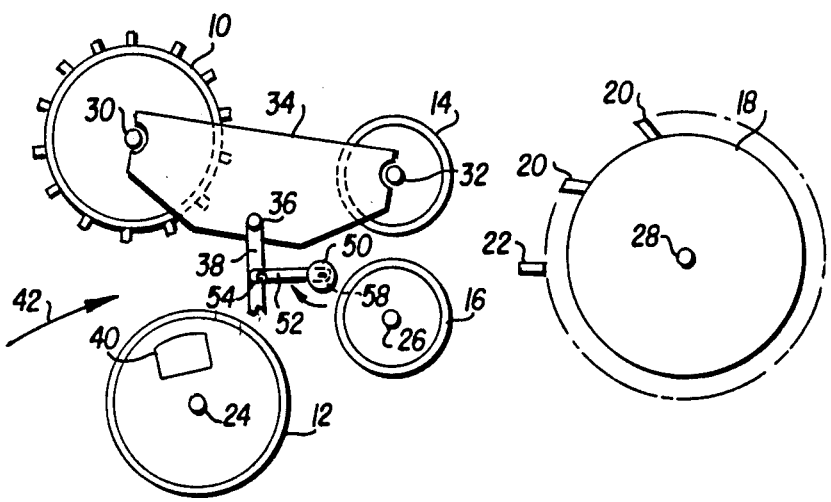
FIG. 1 is a schematic illustration of the feed mechanism of a forage harvester of the type having tensioned upper feed rolls and a metal detector in one of the lower feed rolls.

FIG. 1 schematically illustrates the feed mechanism of a forage harvester including upper and lower front feed rolls 10 and 12, upper and lower rear feed rolls 14 and 16 and a rotating cutter head 18 having a plurality of knives 20 cooperating with a shear bar 22 to cut or chop crop material. The feed mechanism is well known in the art and various aspects thereof are shown and described in Shriver U.S. Pat. No. 4,278,211 and Garrott U.S. Pat. No. 3,959,953.

As explained in the Shriver patent, the lower feed rolls 12 and 16 and the cutter head 18 are mounted on fixed bearing supports 24, 26 and 28. The upper feed rolls 10 and 14 are mounted for rotation about bearing supports 30 and 32 which are in turn supported in a plate-like connecting member 34. There are two connecting members 34, one of which is shown in FIG. 1. The other connecting member is located at the opposite end of the upper feed rolls. Both connecting members are located outboard of side sheets (not shown) which define the lateral limits of the crop feed path. Each connecting member 34 is connected by a pivot pin 36 to a link 38. Although not shown in FIG. 1, the links 38 are each connected to a crank arm and the crank arms are securely affixed to a torsion bar extending between the crank arms. The torsion bar causes any displacement of one of the connecting members 34 to be transmitted to the other connecting member thus maintaining the axes of rotation of upper feed rolls 10 and 14 parallel to the axes of rotation of lower feed rolls 12 and 16, respectively. A tension spring (not shown in FIG. 1) exerts tension on the crank arms thereby urging the links 38 downwardly as fully explained in the Shriver patent. Stops (not shown) act against the lower edges of bearing supports 30 and 32 to thereby establish the lower most portion of the upper feed rolls so that they do not contact the lower feed rolls. A metal detector 40 is mounted in a fixed position inside lower front feed roll 12.

The forage harvester is provided with a pickup mechanism (not shown) which picks up crop material from a field and feeds it into the harvester along a path generally indicated by arrow 42. The crop material is compressed between front feed rolls 10 and 12 which feed the crop material into rear feed rolls 14 and 16. The rear feed rolls further compress the crop material and feed it into the cutter head 18 where it is cut between knives 20 and the shear bar 22. After cutting, the crop material is ejected from the harvester by conventional apparatus (not shown).

The metal detector 40 senses for tramp metal in the crop material passing between the front feed rolls. If tramp metal is detected, the metal detector produces an output signal. Conventionally, this output signal is applied to a threshold detector 44 which drives a single shot multivibrator 46 that in turn controls a stop pawl solenoid 48. When the metal detector detects tramp metal it produces an output signal which exceeds the threshold level of threshold detector 44. The threshold detector then produces an output signal to trigger the multivibrator 46 which then momentarily deenergizes the stop pawl solenoid 48. As explained in the aforementioned Garrott patent, the stop pawl is normally held out of engagement with a ratchet wheel by the solenoid but when the solenoid is deenergized the pawl is spring biased into engagement with the ratchet wheel thus stopping rotation of the ratchet wheel. The ratchet wheel is in the drive train for the feed rolls 10, 12, 14 and 16 so when the ratchet wheel stops these elements also stop thereby preventing the tramp metal from being fed into the cutter head where it could cause extensive damage. A slip clutch in the drive train prevents damage to the drive train when the pawl engages the ratchet wheel.

In a forage harvester as described above, the rotating metallic parts of the harvester induce an electrical noise signal component in the metal detector output signal and it has been conventional to set the threshold level of detector 44 to some value slightly above the greatest magnitude of the noise component. However, it is desirable to be able to set the threshold level as low as possible so that tramp metal will cause the metal detector output signal to exceed the threshold even though the noise component is at a minimum. The reason for this is obvious from FIG. 3A. If tramp metal entry occurs when the noise component is at or near a maximum (A) the output signal from metal detector 40 exceeds the threshold (TH) and the threshold detector produces an output signal so that the feed drive is stopped. On the other hand, if entry of the same piece of tramp metal occurs when the noise component is at or near its minimum (B) the output signal from the metal detector does not exceed the threshold TH and the harvester drive is not stopped.

The problem becomes worse when one considers that, for a given size metal object, the signal induced in the metal detector 40 varies in magnitude depending on the proximity of the object to detector 40 as it passes through the sensing field of the detector. Thus, in FIG. 3B the threshold level TH must still be set above the noise component induced in the metal detector when bulk crop flow between the feed rolls is at a minimum (i.e. when the upper feed rolls are at their lowermost position relative to the metal detector). On the other hand, when the bulk crop rate is at a maximum, the upper feed rolls are at their greatest displacement from the detector 40 and their noise component is much smaller as illustrated by the waveform in FIG. 3B. Thus, there is a reduced likelihood that a tramp metal object of a given size will be detected during heavy crop feed conditions.

Figure 2:
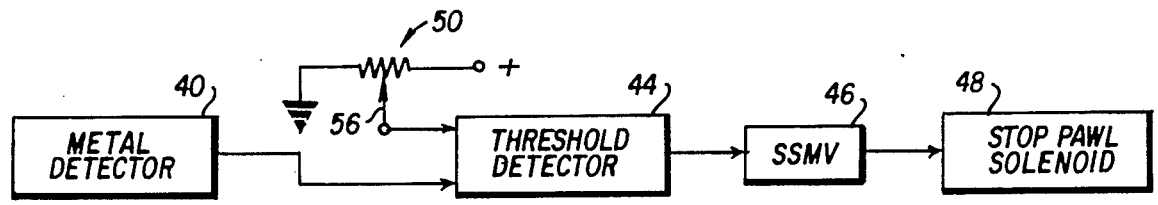
FIG. 2 is a block diagram of a metal detector system having a crop sensor for varying the threshold level at which an output signal is produced to stop the harvester feed mechanism.

In order to provide more uniform sensitivity of the metal detector system, a crop sensor 50 is provided for sensing the bulk of crop flow by sensing displacement of the upper feed rolls upwardly from their lowermost position. The crop sensor 50 may be any form of variable impedance device such as a potentiometer. The sensor is mounted on the frame of the harvester outboard of one of the side sheets defining the feed path. The wiper arm shaft 58 of the potentiometer is connected to an arm 52 and the arm is in turn connected to the link 38 by a pin 54 mounted on the link. The arm 52 is provided with an elongated hole through which the pin 54 extends so that the arm may rotate the shaft of potentiometer 50 as the link 38 moves. As shown in FIG. 2, the resistance element of the crop sensor is connected between +V and ground, and the wiper arm is electrically connected to the threshold detector 44 so that as the resistance between +V and wiper arm 56 is varied, the threshold level of detector 44 is varied.

Figure 3A:
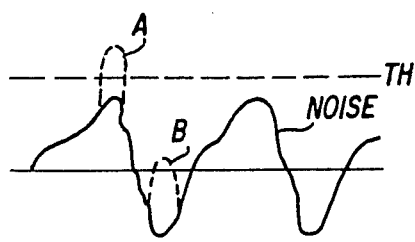
FIGS. 3A and 3B are waveform diagrams illustrating the advantage of the present invention; and, FIG. 4 is a block circuit diagram of a metal detector system wherein the threshold level is varied by a variable gain amplifier.

The crop sensor is adjusted as follows. With the arm loose on potentiometer shaft 58 and the upper feed rolls at their lowest extent of travel, the shaft 58 is rotated to move wiper arm 56 until the desired threshold level signal is applied to detector 44. The level of this signal should be slightly above the level of the noise component induced in the metal detector output signal when the upper feed rolls are rotating and there is no crop material moving through the feed. That is, the threshold level is set at TH as shown in FIG. 3A. After the wiper arm 56 is thus adjusted, a set screw or other fastener is tightened to affix arm 52 to potentiometer shaft 58.

Figure 3B:
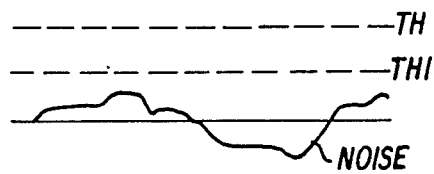

With the threshold level thus adjusted, the noise component of the metal detector output signal will be as illustrated in FIG. 3A during light crop flow and will be below the threshold TH. When the crop flow becomes heavy the crop material displaces the upper feed rolls (and plate 34) upwardly causing a reduction in the noise signal as shown in FIG. 3B. The plate carries with it the pin 36 to which link 38 is affixed. As link 38 moves upwardly the pin 54 rotates arm 52 and potentiometer shaft 58. In FIG. 2, the rotation of shaft 58 moves wiper arm 56 to change the threshold level of the detector 44 to a level TH1 which is lower than TH. The noise component will not exceed TH1 because the upper feed rolls are displaced from metal detector 40 and thus induce a smaller noise signal therein. Because the threshold level TH1 is lower than TH a smaller metal detector signal, resulting from the detection of tramp metal, will still cause the detector to produce an output signal to stop the feed drive mechanism.

Figure 4:
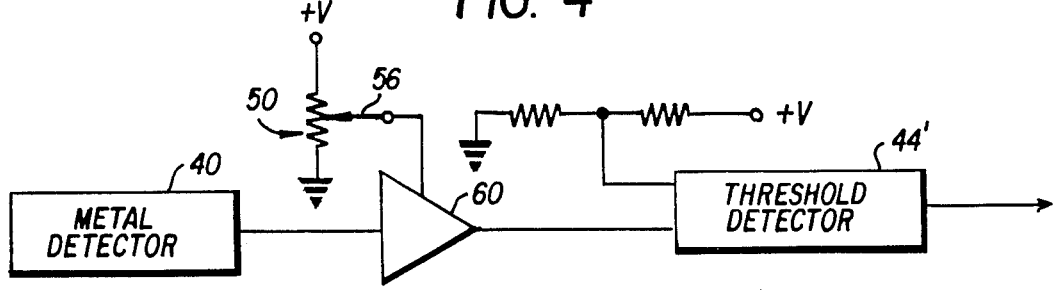

In FIG. 2, the sensitivity of the metal detector system is varied by varying the threshold level of the threshold detector 44. However, as illustrated in FIG. 4, the sensitivity of the metal detector system may alternatively be varied by providing a variable gain amplifier 60 connected between the output of the metal detector 40 and the input of a threshold detector 44'. In this arrangement the threshold of detector 44' is fixed at the level TH illustrated in FIGS. 3A and 3B. The wiper arm 56 of crop sensor 50 is connected to amplifier 60 and controls its gain. The gain of amplifier 60 is set so that at minimum bulk crop flow the output of amplifier 60 does not exceed threshold TH. However, when heavy crop flow displaces the upper feed rolls away from detector 40, and the noise component of the output signal from the detector 40 decreases, the upward displacement changes potentiometer 50 to thereby increase the gain of amplifier 60 so that the noise component is still just below the detection level TH. Any signal induced in metal detector 40 by tramp metal is similarly amplified and thus there is a greater likelihood that tramp metal passing through the feed near the upper front feed roll 10 will still be detected.

From the foregoing description it is seen that the present invention provides a novel method and apparatus for adjusting the sensitivity of a metal detector system, the sensitivity being increased in response to displacement of machine parts, which induce noise in the detector, away from the detector.

While preferred embodiments of the invention have been described in the invention have been described in specific detail, it will be understood that various modifications and substitutions may be made in the described embodiments without departing from the spirit and scope of the invention as defined by the appended claims.

The embodiments of the invention in which an exclusive property or privilege are claimed are defined as follows.

1. In a forage harvester having a metal detector system for detecting tramp metal moving with crop material through a crop feed, and a pair of feed rolls for feeding crop material through said crop feed, at least one of said feed rolls being movable relative to a metal detector in said metal detector system at varying distances therefrom to induce a noise component in the output signal produced by said metal detector, a method of providing a more uniform detection of tramp metal in said crop material, said method comprising sensing displacement of said one feed roll relative to said metal detector, and varying the sensitivity of said metal detector system in accordance with said displacement.

2. In a forage harvester having a metal detector system for detecting tramp metal moving with crop material through a crop feed, and a pair of feed rolls for feeding crop material through said crop feed, at least one of said feed rolls being movable relative to a metal detector in said metal detector system at varying distances therefrom to induce a noise component in the output signal produced by said metal detector, apparatus for providing a more uniform detection of tramp metal in said crop material, said apparatus comprising sensing means for sensing displacement of said one feed roll relative to said metal detector, and means for varying the sensitivity of said metal detector system in accordance with said displacement.

3. Apparatus as claimed in claim 2 wherein said metal detector system includes a threshold detector responsive to the output signal from said metal detector for producing a stop signal when said output signal exceeds a threshold value.

4. Apparatus as claimed in claim 3 wherein said sensing means comprises means for producing an electrical signal in response to displacement of said one feed roll, and means for applying said electrical signal to said threshold detector to change said threshold value.

5. Apparatus as claimed in claim 3 and further comprising a variable gain amplifier connected to said metal detector and said threshold detector for applying said metal detector output signal to said threshold detector with variable gain; said sensing means comprising means for producing an electrical signal in response to displacement of said one feed roll, and means for applying said electrical signal to said variable gain amplifier to vary the gain thereof in accordance with the distance between said one feed roll and said metal detector.

6. Apparatus as claimed in claim 4 wherein said sensing means comprises a voltage source, a variable impedance connected across said voltage source, and means responsive to displacement of said one feed roll toward or away from said metal detector to vary said impedance to thereby vary the magnitude of said electrical signal.

7. Apparatus as claimed in claim 5 wherein said sensing means comprises a voltage source, a variable impedance connected across said voltage source, and means responsive to displacement of said one feed roll toward or away from said metal detector to vary said impedance to thereby vary the magnitude of said electrical signal.

8. Apparatus as claimed in claim 6 and further comprising means responsive to said stop signal for stopping movement of said feed rolls.

9. Apparatus as claimed in claim 7 and further comprising means responsive to said stop signal for stopping movement of said feed rolls.

* * * * *